US011254822B2

(12) United States Patent
Grorud

(10) Patent No.: US 11,254,822 B2
(45) Date of Patent: Feb. 22, 2022

(54) COMPOSITION

(71) Applicant: Jotun A/S, Sandefjord (NO)

(72) Inventor: Mette Grorud, Sandefjord (NO)

(73) Assignee: Jotun A/S, Sandefjord (NO)

( * ) Notice: Subject to any disclaimer, the term of this patent is extended or adjusted under 35 U.S.C. 154(b) by 0 days.

(21) Appl. No.: 16/610,583

(22) PCT Filed: May 15, 2018

(86) PCT No.: PCT/EP2018/062576
§ 371 (c)(1),
(2) Date: Nov. 4, 2019

(87) PCT Pub. No.: WO2018/210849
PCT Pub. Date: Nov. 22, 2018

(65) Prior Publication Data
US 2020/0148891 A1    May 14, 2020

(30) Foreign Application Priority Data

May 15, 2017  (EP) .................. 17171108

(51) Int. Cl.
*C09D 7/61*  (2018.01)
*C09D 5/03*  (2006.01)
*C09D 167/00*  (2006.01)

(52) U.S. Cl.
CPC ............. *C09D 5/032* (2013.01); *C09D 7/61* (2018.01); *C09D 167/00* (2013.01)

(58) Field of Classification Search
CPC ........ C09D 5/032; C09D 7/61; C09D 167/00; C08G 77/16; C08G 77/18; C08G 77/80
See application file for complete search history.

(56) References Cited

U.S. PATENT DOCUMENTS

| | | | | |
|---|---|---|---|---|
| 4,877,837 A * | 10/1989 | Reising | ............... | C08F 8/42 525/100 |
| 5,719,230 A | 2/1998 | Ando et al. | | |
| 6,858,257 B1 * | 2/2005 | Cordiner | ............... | C09D 5/031 15/257.05 |
| 6,936,663 B1 * | 8/2005 | Modisette | ............ | C09D 5/033 525/100 |
| 7,129,310 B2 | 10/2006 | Greene et al. | | |
| 7,244,780 B1 * | 7/2007 | Robinson | .............. | C09D 5/036 524/441 |
| 2005/0065294 A1 | 3/2005 | Cramer et al. | | |
| 2005/0136267 A1 | 6/2005 | Greene et al. | | |
| 2006/0062908 A1 * | 3/2006 | Ohkoshi | .............. | C09D 5/032 427/180 |

FOREIGN PATENT DOCUMENTS

| | | |
|---|---|---|
| CN | 102690584 | 9/2012 |
| CN | 105153890 A | 12/2015 |
| CN | 105542621 | 5/2016 |
| EP | 3 239 226 | 11/2017 |
| JP | H 10168345 A | 6/1998 |
| JP | 2005296836 | 10/2005 |
| RU | 2245893 | 2/2005 |
| WO | WO 2011/138431 A1 | 11/2011 |
| WO | WO 2011/138432 A1 | 11/2011 |
| WO | WO 2014/051674 | 4/2014 |
| WO | WO 2014/107445 | 7/2014 |
| WO | WO 2015/114092 A1 | 8/2015 |
| WO | WO 2015/161380 | 10/2015 |
| WO | WO 2016/038036 | 3/2016 |

OTHER PUBLICATIONS

Paper—Powder Coating using Metallic Powders. Architect Information Surface Finishes from Schüco International KG. Dec. 2014, 28 pages.
International Search Report and Written Opinion for PCT/EP2018/062576 dated Jun. 12, 2018, 11 pages.
International Preliminary Report on Patentability for Application No. PCT/EP2018/062576, dated Nov. 19, 2019, 8 pages.
Chende et al., Coating Development and Testing, Science and Technical Documentation Press, p. 131, 2015.

* cited by examiner

*Primary Examiner* — Robert S Jones, Jr.
(74) *Attorney, Agent, or Firm* — Dority & Manning, P.A.

(57) ABSTRACT

A particulate coating composition, and preferably a powder coating composition, comprising: (i) at least one polyester polymer; (ii) at least one hardener; (iii) at least 0.1 wt % of at least one metallic pigment; and (iv) at least one polyorganosiloxane.

18 Claims, No Drawings

COMPOSITION

CROSS REFERENCE TO RELATED APPLICATION

This application is the national stage entry of International Patent Application No. PCT/EP2018/062576 having a filing date of May 15, 2018, which claims priority to and the benefit of European Patent Application No. 17171108.8 filed with the European Patent Office on May 15, 2017, the entire contents of which are incorporated herein by reference.

INTRODUCTION

The present invention relates to a particulate coating composition and particularly a powder coating composition, comprising: at least one polyester polymer, at least one hardener, at least 0.1 wt % of a least one metallic pigment and at least one polyorganosiloxane. The invention also relates to a container containing the composition, a kit comprising the components of the composition and a method for making the composition. Additionally the invention relates to a coating comprising the composition, a substrate coated with the composition and to methods of coating a substrate with the composition.

BACKGROUND

Traditionally, coating powders have been made by the extrusion of a mixture of polymers and hardeners (as well as standard additives etc.) to obtain a homogeneous mixture and then grinding the extrudate and screening the product to obtain the desired particle sizes and particle size distribution. The powder is then electrostatically sprayed onto a substrate, often a metal substrate, and cured at high temperatures. The nature of the finish on the substrate may be adjusted by the addition of additives to the coating powder.

A growing market for powder coatings is in the field of metallic powder coatings which provide a metallic effect on the surface being coated. The metallic effect is achieved by adding metallic pigments into the powder coating at an appropriate time. These metallic effect pigments may corrode, however, if they are exposed to oxygen, humidity, acid, alkali etc. Corrosion very quickly ruins the appearance and integrity of the coating.

To avoid the problem of corrosion, one approach used is to apply an extra, separate, clear coating layer over the metallic effect coating in order to provide protection. Essentially the clear coating layer acts as a barrier between the corrodible metallic pigments and the atmosphere. Unfortunately the application of this further coat is time consuming and expensive. It also increases the overall thickness of the coating which, in some applications, is undesirable.

In an alternative approach the problem of corrosion of metallic pigments has been addressed by coating the metallic pigment particles themselves. The coating is ideally based on epoxy and polyester polymers and is therefore compatible with the binder which generally forms the major part of the coating. The idea is that embedding the metallic pigments within the epoxy/polyester polymer prevents corrosion of the pigment. In essence therefore, metallic particles that are coated to isolate the metal from air, moisture, acids and alkalis are provided. Some manufacturers even use a double coating technique, e.g. based on an inorganic/organic double coating such as a silica coating followed by an acrylate coating or polyester/epoxide coating.

Coating of the metal particles improves the stability of the pigments during storage, but the resistance of these particles to corrosion once applied to a substrate is still not ideal Thus whilst many metallic particles are coated to enable storage over a prolonged period before application, our experience is that on application, these particles are still susceptible to oxidation and degradation upon exposure to acids and alkalis as well as to humidity.

SUMMARY OF INVENTION

Viewed from a first aspect, the present invention provides a particulate coating composition, and preferably a powder coating composition, comprising:
(i) at least one polyester polymer;
(ii) at least one hardener;
(iii) at least 0.1 wt % of at least one metallic pigment; and
(iv) at least one polyorganosiloxane.

Viewed from a further aspect, the present invention provides a container containing a particulate composition as hereinbefore described.

Viewed from a further aspect, the present invention provides a kit comprising:
(i) a first container containing at least one polyester polymer, at least one hardener, and at least one polyorganosiloxane;
(ii) a second container containing at least 0.1 wt % of said at least one metallic pigment, based on the total weight of contents of the containers of the kit; and
(iii) instructions for mixing the at least one polyester polymer, at least one hardener, at least one polyorganosiloxane and at least 0.1 wt % of at least one metallic pigment.

Viewed from a further aspect, the present invention provides a process for preparing a particulate coating composition, and particularly a powder coating composition, comprising:
(i) blending at least one polyester polymer, at least one hardener, and at least one polyorganosiloxane to form a mixture;
(ii) extruding said mixture to form particles; and
(iii) adding said at least 0.1 wt % of at least one metallic pigment to said particles.

Viewed from a further aspect, the present invention provides a coating, preferably a cured coating, comprising a particulate composition as hereinbefore described.

Viewed from a further aspect, the present invention provides a coating obtainable by spraying and curing a particulate composition as hereinbefore described.

Viewed from a further aspect, the present invention provides a substrate coated with a particulate composition as hereinbefore described or a coating as hereinbefore described.

Viewed from a further aspect, the present invention provides a method for coating a substrate with a particulate composition as hereinbefore described, comprising:
i) applying said particulate composition to said substrate; and
ii) optionally curing said particulate composition.

Viewed from a further aspect, the present invention provides the use of a particulate composition as hereinbefore described to coat a substrate.

Definitions

As used herein the term "particulate coating composition" refers to a mixture of particles which when applied to a surface and heated, e.g. cured, forms a coating thereon.

As used herein the term "powder coating composition" refers to dry, free flowing powder which when applied to a surface and heated, e.g. cured, forms a coating thereon. Typically the particles that constitute the powder have an average diameter of 10-120 µm.

As used herein the term "polyester polymer" refers to a polymer comprising ester (—COO—) linker groups.

As used herein, the phrase "acid number" refers to the number of mg KOH required to neutralize the alkali-reactive groups in 1 g of polymer and has the units (mg KOH/g polymer). The acid number is determined according to ASTM standard test method D974.

As used herein, the phrase "hydroxyl number" refers to the number of milligrams (mg) of KOH equivalent to the hydroxyl groups present in each gram (g) of polymer and has the units (mg KOH/g polymer).

As used herein, the phrase "equivalent epoxy weight" or "EEW" refers to the number of epoxide equivalents in 1 kg of resin. It is measured by ASTM D-1652

As used herein the term "hardener" refers to a compound which, when mixed with the polyester polymer, produces a hardened coating. Sometimes hardeners are referred to as curing agents.

As used herein the term "metallic pigment" refers to a pigment comprising a metal that is corrodible. Metal salts are not generally metallic pigments.

As used herein the term "polyorganosiloxane" refers to a polymer comprising organosiloxane repeat units. Organosiloxane repeat units comprise a Si—O bond and at least one Si-organic group bond.

As used herein the term "alkyl" refers to saturated, straight chained, branched or cyclic groups. Alkyl groups may be substituted or unsubstituted.

As used herein the term "cycloalkyl" refers to a saturated or partially saturated mono- or bicyclic alkyl ring system containing 3 to 10 carbon atoms. Cycloalkyl groups may be substituted or unsubstituted.

As used herein the term "aryl" refers to a group comprising at least one aromatic ring. The term aryl encompasses heteroaryl as well as fused ring systems wherein one or more aromatic ring is fused to a cycloalkyl ring. Aryl groups may be substituted or unsubstituted. An example of an aryl group is phenyl, i.e. $C_6H_5$. Phenyl groups may be substituted or unsubstituted.

As used herein the term "substituted" refers to a group wherein one or more, for example up to 6, more especially 1, 2, 3, 4, 5 or 6, of the hydrogen atoms in the group are replaced independently of each other by the corresponding number of the described substituents. The term "optionally substituted" as used herein means substituted or unsubstituted.

As used herein, the term "aralkyl" or "arylalkyl" refers to an alkyl group substituted by an aryl group.

As used herein, the term "alkaryl" or "alkylaryl" refers to an aryl group substituted by an alkyl group.

As used herein the term "halide" refers to Cl, F and Br.

As used herein the term "molecular weight" refers to weight average molecular weight (Mw), unless otherwise specified.

DESCRIPTION OF THE INVENTION

The present invention relates to a particulate coating composition, and in particular a powder coating composition, comprising at least 4 components. The components are:
(i) at least one polyester polymer;
(ii) at least one hardener;
(iii) at least 0.1 wt % of at least one metallic pigment; and
(iv) at least one polyorganosiloxane.

Optionally the particulate coating composition of the invention further comprises: (v) filler; (vi) non-metallic pigment; (vii) flow additive and/or (viii) degassing additive.

Advantageously the powder coating composition of present invention minimises or prevents the corrosion of the metallic pigment present therein. Specifically the powder coating composition of the invention minimises or prevents acid, alkali or water damage to the coating. This means that the metallic effect, e.g. the colour and gloss, of the metallic coating is maintained for longer.

Polyester Polymer

The coating composition of the present invention comprises at least one polyester polymer. Preferably the polyester polymer is solid at room temperature (i.e. at 20° C.). Preferably the polyester polymer has a Tg above 40° C. and more preferably above 50° C. The maximum value of the Tg is preferably 100° C.

The polyester polymer present in the coating composition of the present invention preferably has a weight average Mw of at least 1000 and more preferably at least 2000. Preferably the polyester polymer has a weight average Mw of 1000 to 10,000, more preferably 2000 to 6000 and still more preferably 2500 to 5000.

The polyester polymer present in the coating compositions of the present invention preferably comprises at least one reactive functional group. Preferably the reactive functional groups present in the polyester polymer enables the polymer to react with functional groups (e.g. epoxide) present in the hardener of the composition to achieve curing. Preferably the reactive functional groups are pendant, terminal or both pendant and terminal groups.

Preferably the polyester polymer present in the coating composition of the present invention comprises at least one functional group selected from hydroxyl, carboxyl, ester and isocyanate. Particularly preferably the polyester polymer comprises at least one functional group selected from hydroxyl and carboxyl and still more preferably carboxyl. Preferably therefore the polyester polymer is a carboxylated or hydroxylated polyester polymer. Especially preferred polyester polymers comprise a plurality of carboxyl functional groups, and particularly a plurality of pendant carboxyl functional groups.

Preferably the polyester polymer present in the coating composition of the present invention has an acid value acid value (AV) between 20-80 mg KOH/g, more preferably 30 to 70 mg, KOH/g, and still more preferably 40-60 mg KOH/g. Polyester polymers having an AV of 55 to 68 mg KOH/g or 60 to 70 mg KOH/g are especially preferred. The carboxyl functionality, i.e. the average number of carboxyl groups present in each molecule of the polymer is preferably greater than 2, e.g. 2.2-5.0. Similarly the hydroxyl number of a hydroxylated polyester polymer is preferably 50-300 mg KOH/g, more preferably 60 to 200 mg KOH/g and still more preferably 70 to 150 mg KOH/g. The hydroxyl functionality, i.e. the average number of hydroxyl groups present in each molecule of the polymer is preferably greater than 2, e.g. 2.2-5.0.

Preferred polyester polymer present in the coating composition of the present invention is designated 50/50 type resin to 80/20 type resin. With an 80/20 resin, 80 wt % carboxyl functional polyester polymer is used with 20 wt % hardener. The value of AV and EEW (described below), should preferably complement each other. For example, the AV of a 50/50 type resin may be 60 to 80 mg KOH/g. Resins that are defined as 80/20 resins will have lower AV, such as 20 to 40 mg KOH/g.

The polyester polymer present in the coating composition of the present invention may be saturated or unsaturated, but is preferably saturated. Saturated polyester polymers comprising at least one functional group selected from hydroxyl and carboxyl and still more preferably carboxyl are particularly preferred. The functional groups are capable of reacting with hardener, e.g. epoxy. Alternatively the polyester polymer may be an unsaturated polyester. These polymers may be hardened using peroxide initiators, optionally in conjunction with infrared radiation or radiation or using photo initiators for radiation cure with UV. The hardener in this case is the initiator. The term unsaturated polyester implies the presence of multiple unsaturated bonds in the side chains of the polyester, e.g. introduced through (meth)acrylate. Preferred unsaturated polyesters are amorphous or crystalline. Suitable crystalline unsaturated polyesters are described in WO2011/138431 A1 and WO2011/138432 A1.

The polyester polymer present in the coating composition of the present invention is preferably derived from aromatic and/or saturated aliphatic acids and polyols. Preferred carboxylic acids (or their anhydrides) have an acid functionality of 2 or greater. Preferred carboxylic acids are aromatic or aliphatic dicarboxylic acid and more preferably aromatic dicarboxylic acids. Preferred polyols are diols.

Examples of multi-functional carboxylic acids suitable for inclusion in the polyester polymer of the present invention include benzene-1,2,4-tricarboxylic acid, phthalic acid, tetrahydrophthalic acid, hexahydrophthalic acid, endobicyclo-2,2,1-5-heptyne-2,3-dicarboxylic acid, tetrachlorophthalic acid, cyclohexanedioic acid, isophthalic acid, terephthalic acid, trimesic acid, 3,6-dichlorophthalic acid, tetrachlorophthalic acid, benzophenone dicarboxylic acid, diphenic acid, 4,4-dicarboxydiphenyl ether, 2,5-pyridine dicarboxylic acid, trimellitic acid, azelaic acid, maleic acid, succinic acid, adipic acid, sebacic acid, glutaric acid, pimelic acid, suberic acid, azelaic acid, diglycolic acid, 1,12-dodecanoic acid, tetrapropenyl succinic acid, maleic acid, fumaric acid, itaconic acid and malic acid. Preferred acids are terephthalic acid and isophthalic acid.

Examples of suitable multi-functional alcohols for inclusion in the polyester polymer of the present invention include glycerin, trimethylolpropane, trimethylolethane, trishydroxyethylisocyanurate, pentaerythritol, ethylene glycol, diethylene glycol, propylene glycol, trimethylene glycol, neopentyl glycol, 1,3-, 1,2- and 1,4-butanediols, heptanediol, hexanediol, octanediol, 2,2-'bis (4-cyclohexanol) propane, neopentyl glycol, 2,2,3-trimethylpentane-1,3-diol, 1,4-dimethylolcyclohexane, and 2,2,4-trimethylpentane diol. A preferred polyol is neopentyl glycol.

To obtain, for example, carboxyl functional polyester polymer of a given molecular weight, the monomer mixture used to form the polyester polymer has an appropriate excess of carboxyl functionality to hydroxyl functionality. Alternatively to obtain hydroxyl functional polyester of a given molecular weight, the monomer mixture used to form the polyester polymer has an appropriate excess of hydroxyl functionality to carboxyl functionality.

The coating compositions of the present invention may comprise 1, 2, 3 or more polyester polymers. Preferably the coating composition comprises 1 or 2 polyester polymer. Suitable polyester polymers may be prepared using conventional techniques that are well known in the art. Suitable polyester polymers are also commercially available.

The coating composition of the present invention preferably comprises 20-95 wt %, more preferably 30-80 wt % and still more preferably 40-60 wt % polyester polymer.

Hardener

The coating composition of the present invention also comprises a hardener. The hardener reacts with the polyester polymer during curing to form a coating, e.g. a film coating. Preferably therefore the hardener reacts with the polyester polymer.

Preferably the hardener present in the coating composition of the present invention is an epoxy-containing compound or a mixture of such compounds. More preferably the hardener is an epoxy resin.

Preferred epoxy resins present in the coating compositions of the present invention are solid at room temperature, i.e. 20° C.

Preferred epoxy resins present in the coating compositions of the present invention have an equivalent epoxy weight (EEW) of 300-2000, more preferably 500 to 1500 and still more preferably 700-1000. Epoxy resins are sometimes described by their type, e.g. as Type 2, 2.5, 3, 4 or Novalac. Type 2 resins may have an EEW=550-700, e.g. Epikote resin 1002, Epikote resin 3022-FCA. Type 2.5 resins may have a EEW=600-750, e.g. Araldite GT 6450. Type 3 resins may have EEW=700-850, e.g. Epikote resin 3003, Araldite GT 7004. Type 4 type resins may have EEW=800-1000, e.g. Epikote resin 1055. Novalac modified type resins may include Epikote resin 2017 or Araldite GT 7255. Preferred epoxy resins are of type 3.

Suitable epoxy resins for use in the coating composition of the present invention are well known in the art and are available commercially. Representative examples of suitable epoxy resins include TGIC (triglycidyl isocyanurate), Araldite PT 910/PT912, bisphenol A based resins, novolac resins, novolac modified resins, 4,4'-isopropylidenediphenol-epichlorohydrin resins (bisphenol F) based resins and glycidyl methacrylates (GMA). Bisphenol A based resins are preferred.

As an alternative to epoxy resins, other hardeners such as hydroxyalkyl amide hardener and polyisocyanate hardener, such as an uretdione type or a caprolactam blocked isocyanate (e.g. isophorone diisocyanate) may be present in the coating composition of invention. In particular, the polyisocyanate hardeners are preferably used with hydroxyl functionalised polyester polymers to give polyurethanes. Hydroxy alkyl amide hardeners may be used with carboxyl functionalized polyester polymers. Suitable hardeners of this type are also available commercially.

A further alternative hardener is a peroxide. Such hardeners may be used when the polyester polymer is an unsaturated polyester and can undergo a curing reaction with itself upon initiation with a peroxide.

It will be appreciated that the hardener and polyester polymer need to react in order to cure the coating. Accordingly, it is preferred if these components are mixed in such a ratio that reactive groups, e.g. carboxyl, in the polyester polymer and e.g. epoxy groups, within the hardener are within ±25% of stoichiometric ratio. A carboxyl and epoxy ratio within ±10% of stoichiometric ratio is more preferred. A carboxyl and epoxy ratio within ±5% of stoichiometric ratio is most preferred.

The skilled man will be aware that some of the additives discussed below may contain carboxyl groups. When calculating the EEW to AV ratio, account should be taken of the contribution made by any carboxyl groups in the standard additives used in the powder coating. It will be appreciated therefore that this calculation is based on the total number of carboxyl and epoxy groups present. If compounds contain multiple carboxyl or epoxy groups that must be considered in these calculations that will nevertheless be routine for the skilled chemist.

The coating composition of the present invention preferably comprises 20-95 wt %, more preferably 30-80 wt % and still more preferably 40-60 wt % hardener.

The combination of the hardener and polyester polymer is called the binder system herein. Preferably the coating composition employs a hybrid epoxy-carboxyl functional polyester polymer binder system. These systems are well known in the art. It is also within the scope of the invention to employ a pure polyester binder where that binder is a unsaturated polyester which can be hardened via an epoxide.

Thus, the polyester polymer preferably forms 50 to 97 wt % of the binder and more preferably 60-96 wt % of binder. The hardener preferably forms 3 to 50 wt % and more preferably 3 to 40 wt % of the binder. The amount of polyester polymer is preferably around the same as, or in excess of, the hardener. Where an unsaturated polyester binder is employed the polymer can form almost 100 wt % of the binder, with a small contribution from the initiator hardener.

The coating composition of the present invention preferably comprises 40-99 wt %, more preferably 50-95 wt % and still more preferably 55-90 wt % binder Metallic Pigment The particulate coating composition of the present invention comprises a metallic pigment. The purpose of the metallic pigment is to provide a coating with a metallic colour effect. Such coatings are used to coat a wide range of different articles, including household appliances, furniture, building components, tools, vehicles and so on.

Preferably the metallic pigment present in the particulate coating composition is corrodible. The advantage of the particulate coating composition of the present invention is that it reduces the corrosion of corrodible metal pigments. For example, the particulate coating composition increases both the acid and alkaline resistance of the metallic pigment and therefore the acid and alkaline resistance of the coating as a whole. Resistance to humidity is also advantageously improved.

The metallic pigment present in the particulate coating composition of the invention may be coated or uncoated. Coatings are sometimes provided on metallic pigments to improve their resistance to corrosion, but it often also affects their metallic appearance. Metallic pigments may be coated with silica or another inert inorganic material for greater chemical resistance and durability. Alternatively, the metallic pigment may be coated with a polymeric material, for example, an acrylic, PTFE or thermosetting plastics material, or may be carried in a polymer or plasticiser which is compatible with the powder coating composition, such as a polyester/epoxide coating. As a further possibility, the metallic pigment may be coated with a colouring agent such as a metal oxide pigment (e.g. iron oxide) to provide special colour effects. The use of metallic pigments coated with silica is preferred to improve the stability of the particles both during storage and during further coating. Double coated particles (e.g. using an inorganic then organic coating) are also possible but are less favoured as their metallic effect is reduced. Optionally the metallic pigments present in the coating of the present invention are uncoated. The protection provided by the polyorganosiloxane in the composition means that coatings on the metallic pigments may be unnecessary.

The metallic pigment present in the particulate coating composition of the invention is preferably in flake form or in particle form. The metallic pigment present may be a non-leafing pigment or a leafing pigment. Non-leafing metallic pigments are preferred. Leafing pigments, e.g. leafing aluminium flakes, generally orient themselves in a continuous layer at or near the surface of a coating producing an opaque silver finish. Non-leafing pigments, e.g. non-leafing aluminium pigments, generally orient themselves throughout the coating providing different aesthetics to leafing pigments. Non-leafing pigments are unique in their ability to project "flop", polychromatic and sparkle effects. "Flop" is the ability to change colour when viewed at different angles. This capability is directly related to flake orientation in the coating.

The metallic pigment present in the particulate coating composition of the invention preferably comprises metal in elemental form or as an alloy. Metal salts (e.g. oxides) are generally not metallic pigments. Examples of suitable alloys include aluminium alloys, stainless steel, bronze or brass.

Preferably the metallic pigment comprises at least Al, Sn or a transition metal, i.e. from groups 3 to 12 of the periodic table (e.g. Cu, Zn), more preferably Al or Sn, and especially preferably Al. Aluminium in elemental form is a particularly preferred metallic pigment. Combinations of two or more different metallic pigments may also be used.

The particle size, d50 of the metallic pigment is preferably 3-50 μm and more preferably d50 10-30 μm. Particle sizes can be measured using a Malvern machine which gives size in d50. D50 is the mass-median-diameter (MMD). The MMD is considered to be the average particle diameter by mass.

The metallic pigment(s) are usually incorporated in the powder coating composition of the present invention after the extrusion or other homogenisation process (hereinafter "post-blended"). One form of post-blending method comprises dry-blending and any available dry-blending method may be used. Metallic pigments may be added before and/or after milling, e.g. at the particle sieving stage. Metallic pigments may also be added at the premix stage, i.e. before extrusion. Products advertised under the trade name "Powdersafe" or "Powdersafe-02" are suitable for direct extrusion.

The pigment and the other components of the powder coating composition are preferably "bonded". A bonding method is to be understood as being a mixing process of a mixture comprising a polyester polymer, a hardener and a polyorganosiloxane, and a metallic pigment in which the metallic pigment particles are physically bonded to the powder coating particles by heating the mixture to the glass transition temperature of the polymers present therein. Adhesion of the metallic pigments to the surface of the powder coating particles is therefore achieved.

A range of hammer and other textured metallic finishes can be produced using, in addition to the metallic pigment, an appropriate hammer or other structure additive.

The coating composition of the present invention preferably comprises 0.1-15 wt %, more preferably 0.5-10 wt % and still more preferably 0.75-7.5 wt % metallic pigment.

Polyorganosiloxane

The coating composition of the present invention comprises a polyorganosiloxane. Preferably the polyorganosiloxane has a softening temperature of at least 40° C. and more preferably at least 45° C. Preferably the polyorganosiloxane has a softening temperature of 40-100° C. and more preferably 40-90° C.

Preferably the polyorganosiloxane has a weight average Mw of 1000-10,000, more preferably 2000-6000 and still more preferably 2000-5000.

The polyorganosiloxane present in the coating composition of the present invention may have a variety of different structures. The polyorganosiloxane may, for example, be linear or non-linear, branched or non-branched or cyclic. Preferably the polyorganosiloxane is cross-linked. Particularly preferably the polyorganosiloxane is cross-linked via —O—Si—O— linkages. In some polyorganosiloxanes the cross-linking creates a 3D, cage or network structure. Some preferred polyorganosiloxanes therefore have a 3D, cage or network structure.

The polyorganosiloxane present in the coating composition of the present invention may be flaked, or unflaked or a mixture thereof. Preferably the polyorganosiloxane is flaked.

Preferred polyorganosiloxanes present in the coating composition of the present invention comprise OH and/or OR substituents, wherein R is $C_{1-24}$ alkyl or $C_{6-24}$ aryl. Particularly preferably the polyorganosiloxane comprises OH substituents. Preferred polyorganosiloxanes comprise 1.0-15.0 wt %, more preferably 2.0-12.0 wt % and still more preferably 2.5-10.0 wt % of OH groups, based on the total weight of the polyorganosiloxane. Substituents, e.g. OH, present on polyorganosiloxane may be pendant, terminal or a combination thereof.

Preferably the polyorganosiloxane contains 0.2 wt % or less of organic solvents and more preferably 0.1 wt % or less of organic solvents. Most commercial polyorganosiloxanes contain some residual organic solvent as a consequence of their synthesis. Such organic solvent tends to be internally trapped within the polyorganosiloxane and is generally not removed when the polyorganosiloxane is melt blended with other components to form a coating powder composition. Optionally such residual organic solvent may be removed from the polyorganosiloxane prior to its use in the coating composition of the present invention. This is accomplished by melting the polyorganosiloxane and removing solvent from the molten polymer, e.g., by sparging with a gas, such as nitrogen, or by vacuum.

Preferred polyorganosiloxanes present in the coating composition of the present invention comprise a repeat unit of formula (I):

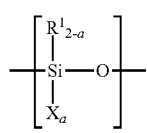

(I)

wherein
each $R^1$ is independently a monovalent organic group;
each X is independently OH, OR' or O—;
each R' is independently $C_{1-24}$ alkyl or $C_{6-24}$ aryl; and
a is 0 or 1.

In preferred repeat units of formula (I), each $R^1$ is selected from $C_{1-20}$ alkyl, $C_{6-20}$ aryl and $C_{7-20}$ aralkyl. More preferably each $R^1$ is selected from $C_{1-20}$ alkyl and $C_{6-20}$ aryl. Examples of suitable alkyl groups include methyl, ethyl, propyl, pentyl, octyl, decyl, dodecyl, cyclopentyl and cyclohexyl. Examples of suitable aryl groups include phenyl, tolyl and xylyl. Examples of suitable aralkyl groups are benzyl and 2-phenylethyl. Particularly preferably each $R^1$ is selected from methyl and phenyl.

In preferred repeat units of formula (I), each X is selected from OH or O—. When X is O— a cross link is formed.

Further preferred polyorganosiloxanes present in the coating compositions of the present invention comprise a unit of formula (II):

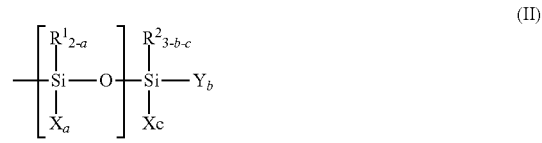

(II)

wherein
each $R^1$ and $R^2$ is independently a monovalent organic group;
each X is independently OH, OR' or O—;
Y is OH or OR';
each R' is independently $C_{1-24}$ alkyl or $C_{6-24}$ aryl;
a is 0 or 1;
b is 0, 1 or 2; and
c is 0, 1 or 2, with the proviso that b+c≤3.

In preferred units of formula (II), each of $R^1$ and $R^2$ is independently selected from $C_{1-20}$ alkyl, $C_{6-20}$ aryl and $C_{7-20}$ aralkyl. More preferably each $R^1$ and $R^2$ is selected from $C_{1-20}$ alkyl and $C_{6-20}$ aryl. Examples of suitable alkyl groups include methyl, ethyl, propyl, pentyl, octyl, decyl, dodecyl, undecyl, octadecyl, cyclopentyl and cyclohexyl. Examples of suitable aryl groups include phenyl, tolyl, xylyl and benzyl. An example of a suitable aralkyl group is 2-phenylethyl. Particularly preferably each $R^1$ is selected from methyl and phenyl. Particularly preferably each $R^2$ is selected from methyl and phenyl.

In preferred units of formula (II), each X is selected from OH or O—. When X is O— a cross link is formed.

In preferred units of formula (II), Y is OH. Y is a terminal group.

Preferred polyorganosiloxanes present in the coating composition of the present invention are those of formula (III):

$$M_m D_n T_o Q_p \qquad (III)$$

wherein
M is a group of the general formula (IIIa)

(IIIa),

D is a group of the general formula (IIIb)

(IIIb),

T is a group of the general formula (IIIc)

(IIIc),

Q is a unit of the general formula $SiO_{4/2}$,
where each of $R^3$, $R^4$, $R^5$, $R^6$, $R^7$ and $R^8$ is a monovalent organic group, OH or an alkoxy group comprising 1 to 10 C, preferably 1 to 4 C atoms, wherein not more than 75% of all of $R^3$-$R^7$ groups are hydroxyl or alkoxy groups,
m is an integer 0-20,
n is an integer 0-1000,
o is an integer 0-30,
p is an integer 0-20, and
m+n+o+p is an integer which is at least 2.

In preferred polyorganosiloxanes of formula (III), not more than 50%, still more preferably not more than 25%, and more particularly not more than 10% of all the $R^3$-$R^8$ groups are hydroxyl or alkoxy groups.

In preferred polyorganosiloxanes of formula (III), each of $R^3$-$R^8$ is preferably a monovalent organic group having 1 to 20 carbon atoms which is unsubstituted or substituted by halide, alkoxy, ammonium, or silyl, a hydroxyl group or an alkoxy group having 1 to 10 C atoms. Particularly preferred are unsubstituted alkyl groups, cycloalkyl groups, aryl groups, alkylaryl groups and arylalkyl groups. Each of $R^3$-$R^8$ preferably comprises 1 to 8 carbon atoms.

Examples of suitable unsubstituted alkyl groups for $R^3$-$R^8$ include methyl, ethyl, n-propyl, 2-propyl(=isopropyl), 3,3,3-trifluoropropyl, vinyl, 1-n-butyl, 2-methylpropyl (=isobutyl), 2-butyl, tert-butyl, n-pentyl, cyclopentyl, cyclohexyl, n-nonyl, n-decyl, n-undecyl, 10-undecenyl, n-dodecyl, isotridecyl, n-tetradecyl, n-hexadecyl, allyl, phenyl, benzyl, p-chlorophenyl, o-(phenyl)phenyl, m-(phenyl)phenyl, p-(phenyl)phenyl, 1-naphthyl, 2-naphthyl, 2-phenylethyl, 1-phenylethyl, 3-phenylpropyl, 1-n-hexyl, 1-n-heptyl, 1-n-octyl, 2,4,4-trimethyl-1-pentyl, 2-ethyl-1-hexyl, 2-methyl-1-pentyl, isohexyl and isooctyl. Preferred $R^3$-$R^8$ groups are methyl, ethyl, propyl, isobutyl, 1-n-hexyl, 1-n-octyl, isohexyl, isooctyl, and phenyl, particularly methyl and phenyl.

Examples of suitable substituted alkyl groups for $R^3$-$R^8$ include 3-chloropropyl, chloromethyl, methoxymethyl, ethoxymethyl, 2-trimethylsilylethyl, 2-trimethylsiloxyethyl, 2-trimethoxysilylethyl, 2-dimethylmethoxysilylethyl, 2-dimethoxymethylsilyl, 3-trimethylammoniopropyl, and 3-dimethylbenzylammoniopropyl radical. Further examples of suitable substituted alkyl groups for $R^3$-$R^8$ are those of the general formula:

wherein r is 1 to 6, s is 1 to 100, and $R^9$, $R^{10}$ and $R^{11}$ are each independently H or a monovalent organic group comprising 1 to 20 C atoms, optionally interrupted by heteroatoms. Optionally groups with different units of the general formula (IV) are present in the form of blocks, for example, —$CH_2CH_2CH_2$—O—($CH_2CH_2O)_6$—$CH_3$, —$CH_2CH_2CH_2$—O—($CH_2CH(CH_3)O)_8$—H, —$CH_2CH_2CH_2$—O—($CH_2CH_2CH_2CH_2O)_{10}$—$CH_2CH_2CH_2CH_3$, and —$CH_2CH_2CH_2$—O—($CH_2CH_2O)_{10}$—($CH_2CH(CH_3)O)_8$—$CH_2CH_2CH_2CH_3$.

Further preferred polyorganosiloxanes present in the coating composition of the present invention comprise M and Q units. Preferred polyorganosiloxanes are those of formula (V):

wherein
each of $R^{12}$ and $R^{13}$ is independently a monovalent organic group; and
v is 0, 1 or 2.

Representative examples of suitable monovalent organic groups include alkyl (e.g. methyl, ethyl, propyl, pentyl, octyl, decyl, dodecyl, undecyl, and octadecyl); cycloalkyl (e.g. cyclopentyl and cyclohexyl); aryl (e.g. phenyl, tolyl, xylyl, and benzyl); aralkyl, (e.g. 2-phenylethyl); chlorinated alkyl groups (e.g. chloromethyl and chloropropyl); fluorinated alkyl groups (e.g. fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups (e.g. 2,2-dichlorocyclopropyl, 2,3-dichlorocyclopentyl); fluorinated cycloalkyl groups (e.g. 2,2-difluorocyclopropyl, 2,3-difluorocyclobutyl, 3,4-difluorocyclohexyl, and 3,4-difluoro-5-methylcycloheptyl); and other monovalent organic groups such as hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl.

The polyorganosiloxane of formula (V) is sometimes referred to as a MQ resin. Preferred polymers have a molar ratio of M units to Q units (M:Q) ranging from 0.5:1 to 1.5:1. These mole ratios are conveniently measured by $Si^{29}$ NMR spectroscopy.

Preferably the polyorganosiloxane comprises about 2.0 wt % or less, more preferably about 0.7 wt % or less, still more preferably about 0.3 wt % or less, of terminal units represented by the formula $X''SiO_{3/2}$, where $X''$ represents hydroxyl or an alkoxy such as methoxy and ethoxy.

Further preferred polyorganosiloxanes present in the coating composition of the present invention comprise a T unit. Preferred polyorganosiloxanes are silsesquioxanes, and particularly those of formula (VI):

wherein
each $R^{14}$ is H or a monovalent organic group.

Representative examples of suitable monovalent organic groups include alkyl (e.g. methyl, ethyl, propyl, pentyl, octyl, decyl, dodecyl, undecyl, and octadecyl); cycloalkyl (e.g. cyclopentyl and cyclohexyl); aryl (e.g. phenyl, tolyl, xylyl, and benzyl); aralkyl (e.g. 2-phenylethyl); halogenated alkyl groups (e.g. chlorinated alkyl groups such as chloromethyl and chloropropyl groups); a fluorinated alkyl group (e.g. fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl); chlorinated cycloalkyl groups (e.g. 2,2-dichlorocyclopropyl, 2,3-dichlorocyclopentyl); fluorinated cycloalkyl groups (e.g. 2,2-difluorocyclopropyl, 2,3-difluorocyclobutyl, 3,4-difluorocyclohexyl, and 3,4-difluoro-5-methylcycloheptyl); another monovalent organic group such as a hydrocarbon group substituted with oxygen atoms such as glycidoxyalkyl; a hydrocarbon group substituted with a nitrogen atom such as aminoalkyl and cyano-functional groups such as cyanoethyl and cyanopropyl; and any combination thereof.

Silsesquioxanes suitable for use herein are known in the art and are generally available. For example, a methyl-methoxysiloxane methylsilsesquioxane resin having a DP of about 15 and an average molecular weight (Mw) of about 1200 g/mol is available as DOW CORNING® US-CF 2403 Resin from Dow Corning Corporation. Alternatively, the silsesquioxane may have phenylsilsesquioxane units, methylsilsesquioxane units, or a combination thereof. Such resins are known in the art and are available as, e.g., XIAMETER® Flake resins such as product numbers RSN-0217, RSN-0220, RSN-0233, RSN-0249, RSN-0255, also available from Dow Corning Corporation.

Alternatively the polyorganosiloxane present in the coating composition of the present invention may comprise a DT unit. Preferred polyorganosiloxanes are those of formula (VII):

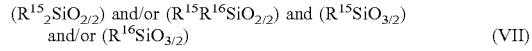

wherein $R^{15}$ is H or a monovalent organic group and $R^{16}$ is OH or alkoxy. Examples of suitable monovalent organic groups are as described above for $R^{14}$.

DT resins are known in the art and are available as, for example, methoxy functional DT resins including XIAMETER® RSN-3074 and XIAMETER® RSN-3037 resins;

and silanol functional resins including XIAMETER® RSN-0804, RSN-0805, RSN-0806, RSN-0808, and RSN-0840 resins, which are also available from Dow Corning Corporation. Other suitable resins include DT resins containing methyl and phenyl groups.

Alternatively the polyorganosiloxane present in the coating composition is of formula (VIII):

$$R^{17}_t R^{18}_u SiO_{(4-t-u)/2} \quad (VI)$$

wherein
each of $R^{17}$ and $R^{18}$ is independently a monovalent organic group, another group of formula (VI), or $OR^{19}$, wherein $R^{19}$ is H or an alkyl or an aryl group having 1 to 24 carbon atoms, and wherein each of t and u is a positive number such that $0.8 \leq (x+y) \leq 4.0$. Exemplary polyorganosiloxanes comprise units including dimethyl, diphenyl, methylphenyl, phenylpropyl and mixtures thereof.

Exemplary polyorganosiloxanes of the present invention comprise random mixtures of methyl and phenyl groups, dimethyl siloxane and diphenyl siloxane groups, or methylphenyl siloxane groups, wherein the ratio of phenyl to methyl groups is 0.5 to 1.5:1, more preferably 0.7:1 to 1.1:1.

The polyorganosiloxane present in the coating composition of the present invention preferably comprises silanol, SiOH, groups. Preferably the silanol content of the polyorganosiloxane is 0.25 wt % or more, for example, 0.5 wt % or more, or 1 wt % or more, or 1.3 wt % or more, or 2.5 wt % or more, or 3 wt % or more, based on the total weight of the polyorganosiloxane. The condensable hydroxyl content of the polyorganosiloxane may be as high as 7 wt %, or as high as 5 wt %, based on the total weight of the polyorganosiloxane.

Examples of suitable polyorganosiloxanes of formula (VI) include those sold by Wacker under the tradename, Silres® as product numbers Silres® 601, 603 and 604.

The coating composition of the present invention preferably comprises 0.5-30 wt %, more preferably 0.75-25 wt % and still more preferably 1.0-20 wt % polyorganosiloxane.

Additives

The powder coating composition of the invention may comprise a wide variety of additives. Examples of additives that are optionally present in the composition of the invention include silane, metal phosphate, metal borate, amino alcohols, filler, non-metallic pigments, flow additives, degassing additive, gloss modifiers, scratch resistors, dyes, waxes, antioxidants, optical brighteners and surface modifying agents. Additional additives are preferably present in an amount of 0 to 60 wt %, more preferably 1-40 wt %, still more preferably 2 to 20 wt % and particularly preferably 5 to 10 wt %, based on the total weight of the composition.

Examples of suitable silanes are those of the formula set out below:

$$Y-R_{(4-z)}SiX_z-$$

wherein z is an integer from 2 to 3;
R is a unsubstituted, unbranched alkyl chain having 2 to 8 C atoms optionally containing an ether or amino linker;
Y is an amino or epoxy functional group bound to the R group; and
X represents an alkoxy group.

Examples of such silanes are the products manufactured by Degussa in Rheinfelden and marketed under the brand name of Dynasylan®D, the Silquest® silanes manufactured by OSi Specialties, and the GENOSIL® silanes manufactured by Wacker. Specific examples include methacryloxypropyltrimethoxysilane (Dynasylan MEMO, Silquest A-174NT), 3-mercaptopropyltri(m)ethoxysilane (Dynasylan MTMO or 3201; Silquest A-189), 3-glycidoxypropyltrimethoxysilane (Dynasylan GLYMO, Silquest A-187), tris(3-trimethoxysilylpropyl) isocyanurate (Silquest Y-11597), gamma-mercaptopropyltrimethoxysilane (Silquest A-189), beta-(3,4-epoxycyclohexyl)ethyltrimethoxysilane (Silquest A-186), gamma-isocyanatopropyltrimethoxysilane (Silquest A-Link 35, Genosil GF40), (methacryloxymethyl)trimethoxysilane (Genosil XL 33), isocyanatomethyl)trimethoxysilane (Genosil XL 43), aminopropyltrimethoxysilane (Dynasylan AMMO; Silquest A-I 110), aminopropyltriethoxysilane (Dynasylan AMEO) or N-(2-aminoethyl)-3-aminopropyltrimethoxysilane (Dynasylan DAMO, Silquest A-I 120) or N-(2-aminoethyl)-3-aminopropyltriethoxysilane, triamino-functional trimethoxysilane (Silquest A-I 130), bis(gamma-trimethoxysilylpropyl)amine (Silquest A-I 170), N-ethyl-gamma-aminoisobytyltrimethoxysilane (Silquest A-Link 15), N-phenyl-gamma-aminopropyltrimethoxysilane (Silquest Y-9669), 4-amino-3,3-dimethylbutyltrimethoxysilane (Silquest Y-I1637), (N-cyclohexylaminomethyl)triethoxysilane (Genosil XL 926), (N-phenylaminomethyl)trimethoxysilane (Genosil XL 973), Deolink Epoxy TE and Deolink Amino TE (D.O.G Deutsche Oelfabrik) and mixtures thereof.

When present, the amount of silane present in the powder compositions of the present invention is preferably 1-10 wt %, more preferably 0.2-6 wt %, still more preferably 0.4-3 wt % and yet more preferably 0.6-3 wt %, based on the total weight of the composition.

Examples of suitable phosphates and borates are metal phosphates and metal borates. A preferred borate is barium metaborate monohydrate.

Phosphates are a preferred additive present in the compositions of the present invention, especially metal phosphates. Preferred phosphates are ortho-phosphate, hydrogen phosphate or a polyphosphate. Particularly preferred phosphates are ortho-phosphates and still more preferably ortho-phosphates of alkali metals or alkaline earth metals.

Specific examples of suitable phosphates are dicalcium phosphate dihydrate, dimagnesium phosphate trihydrate, a zinc phosphate (e.g. a zinc phosphate di- or tetra-hydrate, preferably in the form of spheroidal particles as described in U.S. Pat. No. 5,137,567, spheroidal zinc phosphate as a crystalline phase in admixture with an amorphous phase comprising Fe (II) phosphate and Fe (III) phosphate, zinc phosphate (preferably in spheroidal form) modified with zinc molybdate and rendered organophilic by suitable surface treatment or zinc aluminium phosphate), alkaline earth hydrogen phosphates in conjunction with alkaline earth carbonates, optionally also including one or more additives selected from fluorosilicates, fluoroborates, alkali and alkaline earth fluorides, mixtures of magnesium hydrogen phosphate and calcium hydrogen phosphate, polyphosphates and polyphosphate hydrates, including ammonium polyphosphates, modified strontium aluminium polyphosphate hydrates such as those obtainable under the trade names HEUCOPHOS SAPP and HEUCOPHOS SRPP; zinc aluminium polyphosphate hydrates such as those obtainable under the trade name HEUCOPHOS ZAPP; modified zinc calcium aluminium polyphosphate silicate hydrates such as those obtainable under the trade name HEUCOPHOS ZCPP; and modified calcium aluminium polyphosphate silicate hydrates such as those obtainable under the trade name HEUCOPHOS CAPP; orthophosphate hydrates including modified zinc calcium strontium orthophosphate silicate hydrates such as those obtainable under the trade name HEUCOPHOS ZCP; modified zinc aluminium orthophosphate hydrates such as those obtainable under the trade name HEUCOPHOS ZPA; organically treated basic zinc orthophosphate hydrates such as those obtainable under the trade name HEUCOPHOS ZPO; modified basic zinc molybdenum orthophosphate hydrates such as those obtainable under the trade name HEUCOPHOS ZMP and organic/inorganic modified basic zinc orthophosphate or basic zinc phosphate silicate hydrates such as those obtainable under the trade names HEUCOPHOS ZPZ and ZBZ, respectively; phosphosilicates such as, for example, calcium strontium zinc phosphosilicate (such as the material obtainable under the trade name Halox SZP391 from Halox Pigments), calcium phosphositicate, and zinc aluminium phosphosilicate; organophosphonates including metal organophosphonates such as, for example, salts of a polyvalent metal cation and an organic phosphonic acid containing at least two phosphonic acid groups, for instance, calcium etidronate (1-hydroxyethane-1,1-diphosphonic acid monocalcium dihydrate). A particularly preferred phosphate is dicalcium phosphate dihydrate.

When present, the amount of phosphate or borate present in the powder compositions of the present invention is preferably 1-10 wt %, more preferably 0.2-6 wt %, still more preferably 0.4-3 wt % and yet more preferably 0.6-3 wt %, based on the total weight of the composition.

Aminoalcohols are a preferred additive present in the compositions of the present invention. Examples of suitable aminoalcohols are those of formulae:

where $R^1$ is a linear or branched alkyl group of 1 to 10 carbons, preferably 2 to 8 carbons, and more preferably 2 to 4 carbons, that contains at least one hydroxyl group; and

where $R^1$ is a linear or branched alkyl group of 1 to 10 carbons, preferably 2 to 8 carbons, and more preferably 2 to 4 carbons, or a linear or branched alkyl group of 1 to 10 carbons, preferably 2 to 8 carbons, and more preferably 2 to 4 carbons that contains at least one primary hydroxyl group and $R^2$ is a linear or branched alkyl group of 1 to 10 carbons, preferably 2 to 8 carbons, and more preferably 2 to 4 carbons that contains at least one hydroxyl group.

Preferably the amino alcohol has a molecular weight of less than 500 g/mol, more preferably 50 to 400 g/mol and still more preferably 75 to 350 g/mol.

Preferably the amino alcohol has 1 to 3 amino groups, more preferably 1 to 2 amino groups, and still more preferably 1 amino group. It is preferred if the amine functionality comprises an N—H bond, i.e. the amine is primary or secondary, especially primary (—NH$_2$).

The amino alcohol preferably comprises one hydroxyl group or 2 to 5 hydroxyl groups, such as 2 or 3 hydroxyl groups. It is preferred if the hydroxyl group in these formulae is primary, i.e. forming a —CH$_2$—OH group with the carbon to which it is attached.

Preferably, the amino alcohol has one amine group, ideally a primary amine, and 2 or more, and more preferably 3, hydroxyl groups.

Preferably, the amino alcohols include, but are not limited to diethanolamines, ethanolamines, 2-amino-1-butanol, 2-amino-2-methyl-1-propanols, 2-amino-2-ethyl-1,3-propanediols, tris(hydroxymethyl)aminomethanes, 2-amino-2-methyl-1,3-propanediols, monomethylaminoethanols, isopropylaminoethanols, t-butylaminoethanols, ethylaminoethanols, n-butylaminoethanols, isopropanolamines, diisopropanolamines, and mixtures thereof. More preferably, the alkanolamines of the present invention are diethanolamines, tris(hydroxymethyl)aminomethanes, and mixtures thereof.

Preferred amino alcohols are tris(hydroxymethyl)aminomethane (THAM) and diethanolamine. Possible amino alcohols therefore include: Ethanolamine, 2-(Methylamino)ethanol, 3-Amino-1-propanol, Amino-2-propanol, DL-Alaninol, Amino-1,2-propanediol, Serinol (C3H9NO2), 1,3-Diamino-2-propanol, 1-Amino-2-methyl-2-propanol, 1-Methoxy-2-propylamine, 2-(Ethylamino)ethanol, 2-Amino-1-butanol, 2-Amino-2-methyl-1-propanol, 2-Amino-2-methyl-1-propanol, 2-Dimethylaminoethanol, 3-Methoxypropylamine, 3-Methylamino-1-propanol, 4-Amino-1-butanol, 2-(2-Aminoethoxy)ethanol, 3-Methylamino-1,2-propanediol, Diethanolamine, Tris(hydroxymethyl)aminomethane, N-(2-Hydroxyethyl)ethylenediamine, meso-1,4-Diamino-2,3-butanediol, trans-2-Aminocyclopentanol hydrochloride, 1-Dimethylamino-2-propanol, 2-(Isopropylamino)ethanol, 2-(Propylamino)ethanol, 2-Amino-3-methyl-1-butanol, 3-Dimethylamino-1-propanol, 3-Ethoxypropylamine, 5-Amino-1-pentanol, 2-Amino-1-pentanol, 3-(Dimethylamino)-1,2-propanediol, N-Methyldiethanolamine, 2-(3-Aminopropylamino)ethanol, 1-Amino-1-cyclopentanemethanol, trans-2-Aminocyclohexanol, trans-4-Aminocyclohexanol, 2-(Butylamino)ethanol, 2-(Diethylamino)ethanol, 2-(tert-Butylamino)ethanol, 2-Dimethylamino-2-methylpropanol, 4-(Dimethylamino)-1-butanol, 6-Amino-1-hexanol, 2-Amino-1-hexanol, Bis(2-hydroxypropyl)amine, N-Ethyldiethanolamine, Triethanolamine, N,N'-Bis(2-hydroxyethyl)ethylenediamine, 3-Diethylamino-1-propanol, 3-(Diethylamino)-1,2-propanediol, 1,3-Bis(dimethylamino)-2-propanol, 2-{[2-(Dimethylamino)ethyl]methylamino}ethanol, 2-(Diisopropylamino)ethanol, N-Butyldiethanolamine, N-tert-Butyldiethanolamine, 2-(Dibutylamino)ethanol and mixtures of any of the aforegoing. A particularly preferred aminoalcohol is tris(hydroxymethyl)aminomethane (THAM).

When present, the amount of amino alcohol in the composition of the invention is preferably 0.1 to 10 wt %, such as 0.2 to 5 wt %, preferably 0.2 to 4 wt %, e.g. 0.2 to 3 wt %.

The powder coating composition of the present invention preferably comprises filler. Representative examples of fillers include wollastonite (calcium metasilicate), wollastonite mixed with barium sulfate, mica, mica mixed with barium sulfate, wollastonite mixed with mica, barium sulfate, calcium phosphate, magnesium phosphate perlite and other porous fillers having a low coefficient of thermal expansion (CTE), alumina; clays, such as layered silicates including phyllosilicates, smectite, hectorite, montmorillonite, and kaolin; Na or Mg metasilicate, Mg silicate, talc, chalk, feldspar, CaCO3, sintered glass frit, quartz glass powder, glass rods and glass whiskers having an aspect ratio of from 8:1 to 40:1, chopped glass fibres having an aspect ratio of from 8:1 to 40:1, sodium titanate, silicon carbide, silicon nitride, polytitanocarbosilane, phosphate glass frit having a Tg of from 420 to 450° C., MgO, magnesia.

When present, the amount of filler present in the powder compositions of the present invention is preferably 0-15 wt %, more preferably 0.5-12.5 wt %, and still more preferably 1.0 to 12 wt % based on the total weight of the composition.

The powder coating composition of the present invention preferably comprises non-metallic pigments. Examples of non-metallic pigments include inorganic pigments such as titanium dioxide, red and yellow iron oxides, chrome pigments and carbon black. Examples of organic pigments include phthalocyanine, axo, anthraquinone, thioindigo, isodibenzanthrone, triphendioxane, quinacridone pigments, and vat dye pigments.

When present, the amount of non-metallic pigments present in the powder compositions of the present invention is preferably 0-5 wt % and more preferably 0.1-2 wt %, based on the total weight of the composition.

The powder coating composition of the present invention preferably comprises a flow additive. Examples of suitable flow additives include acrylics, silicon containing compounds and fluorine-based polymers. The flow additives enhance the compositions melt-flow characteristics and help eliminate surface defects during curing.

When present, the amount of flow additive present in the powder compositions of the present invention is preferably 0-5 wt % and more preferably 0.1-2 wt %, based on the total weight of the composition.

The powder coating composition of the present invention preferably comprises a degassing additive. A suitable example is benzoin. When present, the amount of degassing additive present in the powder compositions of the present invention is preferably 0-5 wt % and more preferably 0.1-1 wt %, based on the total weight of the composition.

Containers and Kits

The present invention also relates to a container containing a particulate coating composition as hereinbefore described. Suitable containers include cans and drums.

Alternatively the particulate coating composition of the present invention may be provided in the form of a kit. In a kit the metallic pigment is preferably contained separately to the other components of the powder coating composition. Kits therefore comprise:
  (i) a first container containing at least one polyester polymer, at least one hardener, and at least one polyorganosiloxane;
  (ii) a second containing at least 0.1 wt % of at least one metallic pigment, based on the total weight of components of the kit; and
  (iii) instructions for mixing the at least one polyester polymer, at least one hardener, at least one polyorganosiloxane and at least 0.1 wt % of at least one metallic pigment.

Manufacture

The present invention also relates to a process for preparing a particulate composition as hereinbefore described comprising:
  (i) blending at least one polyester polymer, at least one hardener, and at least one polyorganosiloxane to form a mixture;
  (ii) extruding said mixture to form particles; and
  (iii) adding said at least 0.1 wt % of at least one metallic pigment to said particles.

Preferred processes of the invention further comprise milling the extruded particles. Other preferred processes of the invention further comprise sieving the milled particles. Thus a preferred process of the invention comprises:
  (i) blending at least one polyester polymer, at least one hardener, and at least one polyorganosiloxane to form a mixture;
  (ii) extruding said mixture to form extruded particles;
  (iii) milling said extruded particles to form milled particles;
  (iv) sieving said milled particles; and
  (v) adding said at least 0.1 wt % of at least one metallic pigment to said particles.

Non-metallic pigments may be added to the blend in step (i) or after extrusion. Preferably non-metallic pigments are added to the blend in step (i).

Preferably the polyester polymer, hardener, polyorganosiloxane and optionally non-metallic pigments are premixed and extruded. Any conventional mixing method may be used. The preferred extrusion conditions are conventional and will generally be kept at low temperature, e.g. below 140° C., to avoid premature curing.

In a preferred process of the invention the extruded particles comprising polyester polymer, hardener, polyorganosiloxane and optionally non-metallic pigment are milled to form powder. Milling may be carried out in any conventional mill to a particle size found most suitable for powder application. The particle size distribution d50 of the powder coating composition is preferably in the range of 10 to 120 µm, and still more preferably 15 to 75 µm. The preferred particle size d50 is at least 20 or 25 µm, and advantageously does not exceed 50 µm, e.g. 20 to 45 µm. In general, particle sizes can be established using a Malvern particle size analyser. After milling, sieving is preferably carried out to maximise particle distribution homogeneity Metallic pigments may be added before or after extrusion, but are preferably added after extrusion. Preferably metallic pigments are also added after milling or other homogenisation processes. Metallic pigments and particulate coatings can be bonded together in a process in which the pigment and the particulate coating are mixed and heated to the glass transition temperature of the particulate coating. Adhesion of the metallic pigments to the surface of the particulate coating particles is therefore achieved.

"Metallic effect" pigments, e.g. mica, may also be added before or after extrusion, but are preferably added after extrusion. Preferably metallic effect pigments are also added after milling.

Application to Substrates and Coating

The present invention also relates to a method for coating a substrate with a particulate composition as hereinbefore described, comprising:
  i) applying the particulate composition to said substrate; and
  ii) optionally curing said particulate composition.

The particulate coating of the invention may be applied to a substrate by any conventional powder coating method. Spraying, e.g. electrostatically, is preferred. Triboelectric guns may also be used. Coating techniques are well known in the art and will be familiar to the skilled man.

The present invention also relates to a coating comprising a particulate composition as hereinbefore described. Preferably the coating is cured. Alternatively viewed the present invention relates to a coating obtainable by spraying and curing a particulate coating composition as hereinbefore described.

The particulate coating composition of the present invention may be used to form a single layer coating or used on top of a primer to form a top coat. Preferably, however, the particulate coating composition of the invention is used to form the top coating layer employed on any substrate. Preferably therefore the coating is a top coat. Optionally the coating further comprises an underlying primer coat.

Curing

Once a substrate is coated with the powder coating composition of the invention, the coating is preferably cured. Heat or thermal curing is preferred. The coated substrate may be cured in a conventional convection oven, an IR/convection combination oven, a convection/induction oven or a convection/induction/IR oven.

Where heating is used for curing, the temperature is preferably in the range 100 to 250° C., e.g. 150 to 200° C. Advantageously the powder coating composition of the invention can be cured in short cycles, e.g. of 15 minutes or less.

The powder coating composition is preferably free flowing during the curing operation. Advantageously this leads to smooth, even finishes. The film thickness of the cured coating is preferably 20 to 200 microns such as 30 to 120 microns especially 40 to 100 microns.

It is a feature of the invention that the powder coating composition of the invention does not corrode. The lack of corrosion manifests itself in good colour retention and low gloss change. The coating is preferably resistant to acid, base and water.

Substrate and Articles

The present invention also relates to a substrate coated with a particulate composition as hereinbefore described or a coating as hereinbefore described. The particulate coating composition of the invention may be applied to any substrate. Representative examples of substrates include metal substrate (steel, galvanized steel, aluminium), wood, MDF, HDF, plywood, fibreboard, particleboard, plastic, glass, ceramic, graphite-filled composites and so on. A preferred substrate is a metal substrate. The substrates may ultimately be for interior or exterior use.

The substrate may be partially or completely coated with the particulate composition or coating of the invention. In some cases, for example, only the top surface of the substrate is coated. In other cases all surfaces of the substrate are preferred coated. Preferably the substrate is at least part of a surface of an article. Examples of articles include appliances, building components, furniture, vehicles, fixtures and fittings and so on.

The article being coated may be provided with a primer layer although this is not essential. The primer may use zinc or zinc free powder or liquid corrosion inhibiting primer. Typical epoxy and epoxy/polyester primers comprise 0-85 wt % zinc. The coating of the invention preferably forms the top coat on any substrate. Thus, preferably no additional coating layer is applied thereon. Substrates may therefore comprise a primer layer and top coat comprising the powder composition of the invention or simply comprise the top coat of the invention without a base primer layer.

The invention will now be described by the following non-limiting examples.

EXAMPLES

Test Methods

Film thickness: Measured according to ISO 2178.

Acid resistance: The coatings were exposed to 5% HCl solutions for 15, 30, 60, 90 or 120 minutes. The difference in darkness, $\Delta L$, before and after the test, describes the level of corrosion of the panels. The panels with high performance with respect to corrosion have low absolute $\Delta L$ value, while the panels which are highly corroded have high absolute $\Delta L$ values. $\Delta L$s were measured using a Largo Coloreye 3000 instrument.

Alkaline resistance: The coatings were exposed to 1% NaOH solution and the time to visual darkening was recorded.

Humidity test according to ISO 6270-2 was performed. The coatings were exposed to condensation atmosphere with constant humidity (CH). The air temperature was 40±3° C. and relative humidity was approximately 100% with condensation on test specimens. Gloss and colour before and after the test were measured. Gloss was measured according to ISO 2813 at 60° measurement angle. Color change, $\Delta E$ was measured using a Largo Coloreye 3000 instrument. The difference in darkness and the gloss change describe the corrosion of the panels. The panels with high performance with respect to corrosion have little gloss change and low absolute $\Delta E$ value, while the panels which are highly corroded have high gloss change and high absolute $\Delta E$ values.

Materials

The polymers and compounds used in the examples were all available commercially.

The properties of the polyorganosiloxanes used in the examples are summarised in the table below:

| Name | | T softening (° C.) | OH groups (wt%) | MW |
|---|---|---|---|---|
| PS1 | Polyorganosiloxane containing phenyl groups | 65-85 | 4.5-6.5 | 1200-2600 |
| PS2 | Flaked polyorganosiloxane containing phenyl and methyl groups (1:1 ratio) | 55-80 | 3.5-7.0 | 1800-2400 |
| PS3 | Flaked polyorganosiloxane containing phenyl and methyl groups (0.8:1) | | 5.0 | 4000 |
| PS4 | Flaked polyorganosiloxane containing phenyl and methyl groups (2:1) | | 5.0 | 2500 |

General Manufacturing Procedure

Preparation of Powder:

The ingredients (except metallic pigment) were dry-mixed in a high speed mixer in order to ensure sufficient dispersion of the powder pre-mix. The pre-mix was then added to a Theyson TSK 20-24 twin-screw extruder and extruded under the following conditions: 30 degrees in the feed zone, 50 degrees in the melting zone, 100 degrees in the mixing & dispersion zone, and 100 degrees at the head, 500 rpm, all with 60-65 torque The extruded material was fed to a chilled roll and passed through a crusher, to reduce the chilled material to flakes. The crushed flakes were then fed to a mill. The extruded chips were milled in a mill and sieved through a 125 μm rotational sieve in order to ensure a particle size distribution (PSD) (d50) of 25-50 μm (determined using a Malvern particle size analyser).

The metallic pigment was then gently mixed with the powder.

Application of Powder to Substrate

The powder was applied to panels of iron phosphated cold roll steel using a standard corona charging spray-gun.

Curing of Films

Substrates coated with powder were cured by conventional heat transfer by convection using a Heraeus conventional benchtop oven. The curing temperature was 180° C. object temperature, with 10 minutes curing time at object temperature.

Example 1

Powder Coating Compositions

The examples herein are based on a powder coating composition as described in Table 1 below. 1.5 wt % aluminium pigment was added post extruder. All other components were preblended and extruded as described above. The films produced had a thickness of 50-100 μm.

Test Results
Acid Resistance
The results are shown in Table 2 below.

TABLE 1

| Name | Description | CE | 1 | 2 | 3 | 4 | 5 | 6 | 7 | 8 | 9 | 10 |
|---|---|---|---|---|---|---|---|---|---|---|---|---|
| Carboxyl functional polyester polymer (AV60-70) | Polyester polymer | 37.4 | 35.5 | 33.6 | 35.5 | 33.6 | 37.0 | 36.6 | 35.5 | 37.0 | 36.6 | 35.5 |
| Carboxyl functional polyester polymer (AV55-68) | Polyester polymer | 8.6 | 8.2 | 7.8 | 8.2 | 7.8 | 8.5 | 8.5 | 8.2 | 8.5 | 8.5 | 8.2 |
| Epoxy Type 3 | Epoxy hardener | 40.3 | 38.3 | 36.3 | 38.3 | 36.3 | 39.9 | 39.5 | 38.3 | 39.9 | 39.5 | 38.3 |
| Degassing additive | | 0.3 | 0.2 | 0.2 | 0.2 | 0.2 | 0.3 | 0.3 | 0.2 | 0.3 | 0.3 | 0.2 |
| Flow additive | | 1.1 | 1.1 | 1.0 | 1.1 | 1.0 | 1.1 | 1.1 | 1.1 | 1.1 | 1.1 | 1.1 |
| $TiO_2$ | Non-metallic, white pigment | 1.5 | 1.4 | 1.3 | 1.4 | 1.3 | 1.5 | 1.4 | 1.4 | 1.5 | 1.4 | 1.4 |
| Sodium Feldspar | Filler | 4.3 | 4.1 | 3.9 | 4.1 | 3.9 | 4.3 | 4.2 | 4.1 | 4.3 | 4.2 | 4.1 |
| $BaSO_4$ | Filler | 6.5 | 6.2 | 5.8 | 6.2 | 5.8 | 6.4 | 6.3 | 6.2 | 6.4 | 6.3 | 6.2 |
| PS1 | Polyorganosiloxane | — | 5.0 | 10.0 | — | — | — | — | — | — | — | — |
| PS2 | Polyorganosiloxane | — | — | — | 5.0 | 10.0 | — | — | — | — | — | — |
| PS3 | Polyorganosiloxane | — | — | — | — | — | 1.0 | 2.0 | 5.0 | — | — | — |
| PS4 | Polyorganosiloxane | — | — | — | — | — | — | — | — | 1.0 | 2.0 | 5.0 |
| Aluminium pigment, non leafing | Metallic pigment | 1.5 | 1.5 | 1.5 | 1.5 | 1.5 | 1.5 | 1.5 | 1.5 | 1.5 | 1.5 | 1.5 |

TABLE 2

| Time exposed to 5% HCl solution [min] | Comparative example | 1 ΔL | 2 ΔL | 3 ΔL | 4 ΔL | 5 ΔL | 6 ΔL | 7 ΔL | 8 ΔL | 9 ΔL | 10 ΔL |
|---|---|---|---|---|---|---|---|---|---|---|---|
| 15 | 0.08 | 0.04 | 0.09 | 0.02 | 0.00 | 0.1 | 0.08 | 0.05 | 0.09 | 0.06 | 0.01 |
| 30 | −0.5 | −0.4 | −0.06 | −0.3 | −0.1 | −0.1 | −0.07 | 0 | −0.05 | 0.01 | 0.02 |
| 60 | −2.4 | −1.5 | −0.9 | −1.46 | −0.90 | −1.4 | −1.3 | −0.8 | −1.3 | −1.1 | −0.6 |
| 90 | −4.8 | −2.6 | −2.3 | −2.5 | −2.2 | −3.1 | −3.0 | −2.2 | −3.3 | −2.8 | −1.9 |
| 120 | −6.8 | −3.1 | −3.7 | −3.3 | −3.4 | −4.8 | −4.8 | −4.8 | −5.3 | −4.5 | −3.4 |

The results in Table 2 show that the coatings comprising polyorganosiloxane have lower absolute ΔL values than the comparative example. This shows that the coatings comprising polyorganosiloxane have improved acid resistance than coatings lacking polyorganosiloxane.

Alkaline Resistance
The results are shown in Table 3 below.

TABLE 3

| | Comparative example | 1 | 2 | 3 | 4 | 5 | 6 | 7 | 8 | 9 | 10 |
|---|---|---|---|---|---|---|---|---|---|---|---|
| Time exposed to 1% NaOH without blackening (mins) | 5 | 10 | 25 | 10 | 25 | 10 | 10 | 15 | 7.5 | 10 | 15 |

The results show that the coatings comprising polyorganosiloxane can remain in 1% NaOH, without blackening, for significantly longer than the comparative coating lacking polyorganosiloxane. This shows the coatings comprising polyorganosiloxane have improved alkaline resistance compared to the comparative coatings lacking polyorganosiloxane.

Humidity Resistance

The results are shown in Tables 4, 5 and 6 below. Table 4 shows the results for the powder coating compositions 1-4 described in the table above and Table 5 shows the results for the powder coating compositions 5-10 described in the table above. Table 6 shows the results for the powder coating composition comprising 1.0 wt % aluminium, leafing pigment instead of the non-leafing pigment. Otherwise the compositions were identical to compositions 1-4.

TABLE 4

| Humidity test, 40° C. | Comparative example | 1 | 2 | 3 | 4 |
|---|---|---|---|---|---|
| ΔE, 24 h | 6.5 | 0.02 | 0.06 | 0.03 | 0.07 |
| ΔE, 48 h | 8.4 | 0.2 | 0.1 | 0.2 | 0.1 |
| ΔE, 72 h | 8.8 | 0.6 | 0.2 | 0.3 | 0.2 |
| ΔE, 96 h | stopped | 0.9 | 0.2 | 0.8 | 0.2 |
| ΔE, 192 h | | 3.8 | 0.5 | 3.5 | 0.5 |
| ΔE, gloss, 336 h | | 6.4/37 | 0.9/84 | 5.5/46 | 3.4/64 |
| ΔE, gloss, 700 h | | 7.3/35 | 1.6/79 | 7.6/35 | 5.5/45 |

TABLE 4-continued

| Humidity test, 40° C. | Comparative example | 1 | 2 | 3 | 4 |
|---|---|---|---|---|---|
| ΔE, gloss, 800 h | | 7.3/28 | 1.7/78 | 7.6/34 | 7.1/28 |
| ΔE, gloss, 1000 h | | 7.6/32 | 6.3/28 | 8.4/31 | 7.8/22 |

TABLE 5

| Humidity test, 40° C. | Comparative example | 5 | 6 | 7 | 8 | 9 | 10 |
|---|---|---|---|---|---|---|---|
| ΔE, gloss, 0 h | 0/100 | 0/88 | 0/82 | 0/81 | 0/86 | 0/84 | 0/79 |
| ΔE, gloss, 24 h | 0.3/98 | 0.6/84 | 0.5/81 | 0.2/81 | 3.4/59 | 0.9/79 | 0.1/80 |
| ΔE, gloss, 72 h | 7.6/18 | 6.1/37 | 5.2/47 | 1.6/71 | 8.6/26 | 6.5/41 | 1.3/74 |
| ΔE, gloss, 144 h | stopped | 8.6/22 | 8.7/38 | 6.4/41 | | 9.1/35 | 4.9/62 |
| ΔE, gloss, 192 h | | | | | | | 6.5/56 |

TABLE 6

| Humidity test, 40° C. | Comparative example | 1 | 2 | 3 | 4 |
|---|---|---|---|---|---|
| ΔE, 24h | 36.2 | 17.2 | 4.2 | 13.9 | 6.5 |
| ΔE, 48 h | stopped | stopped | 10.5 | stopped | 11.3 |
| ΔE, 72 h | | 12.2 | 13.0 | | |

The panels with high performance with respect to corrosion have low absolute ΔE values and little change in gloss, while the panels which are highly corroded have high absolute ΔE values and significant changes in gloss. It is clear from the results in tables 4-6 that the powder coating compositions of the invention significantly improve the humidity resistance of the coatings. In table 4 the ΔE values are significantly lower for examples 1-4 compared to the comparative example. The same trend is also observed in Table 5 wherein lower amounts of polyorganosiloxane are present in the powder coating composition.

Table 6 shows the results obtained when a leafing aluminium pigment was included in the powder composition instead of a non-leafing pigment. Since the leafing Al pigment flows to the surface of the coatings, they are more difficult to protect. Nevertheless it is clear from the results that the powder coating compositions of the invention comprising polyorganosiloxane significantly improve the humidity resistance of coatings comprising leafing metallic pigments.

Example 2

Powder Coating Compositions

The examples herein are based on a powder coating composition as described in Tables 7 and 8 below. In table 7 1.5 wt % non-leafing aluminium pigment was added post extruder. In table 8 1.0 wt % leafing aluminium pigment was added post extruder. All the other components were pre-blended and extruded as described above, except that the metallic pigments were more gently mixed with the powder. The films produced had a thickness of 50-100 μm.

Test Results

Acid Resistance

The results are shown in Tables 9 and 10 below.

TABLE 7

| Name | Description | CE1 | CE2 | CE3 | 11 | 12 |
|---|---|---|---|---|---|---|
| Carboxyl functional polyester polymer (AV60-70) | Polyester polymer | 37.4 | 37.0 | 37.0 | 33.3 | 33.3 |
| Carboxyl functional polyester polymer (AV55-68) | Polyester polymer | 8.6 | 8.5 | 8.5 | 7.7 | 7.7 |
| Epoxy Type 3 | Epoxy hardener | 40.3 | 39.9 | 39.9 | 35.9 | 35.9 |
| Degassing additive | | 0.3 | 0.3 | 0.3 | 0.2 | 0.2 |
| Flow additive | | 1.1 | 1.1 | 1.1 | 1.0 | 1.0 |
| $TiO_2$ | Non-metallic, white pigment | 1.5 | 1.5 | 1.5 | 1.3 | 1.3 |
| Sodium Feldspar | Filler | 4.3 | 4.3 | 4.3 | 3.8 | 3.8 |
| $BaSO_4$ | Filler | 6.5 | 6.4 | 6.4 | 5.8 | 5.8 |
| PS1 | Polyorganosiloxane | — | — | — | 10.0 | 10.0 |
| Tris(hydroxymethyl)aminomethane (THAM) | Aminoalcohol | — | 1.0 | — | 0.9 | — |
| Dicalcium phosphate dihydrate | Metal phosphate | — | — | 1.0 | — | 0.9 |
| Aluminium pigment, non leafing | Metallic pigment | 1.5 | 1.5 | 1.5 | 1.5 | 1.5 |

TABLE 8

| Name | Description | CE4 | CE5 | CE6 | 13 | 14 |
|---|---|---|---|---|---|---|
| Carboxyl functional polyester polymer (AV60-70) | Polyester polymer | 37.4 | 37.0 | 37.0 | 33.3 | 33.3 |

TABLE 8-continued

| Name | Description | CE4 | CE5 | CE6 | 13 | 14 |
|---|---|---|---|---|---|---|
| Carboxyl functional polyester polymer (AV55-68) | Polyester polymer | 8.6 | 8.5 | 8.5 | 7.7 | 7.7 |
| Epoxy Type 3 | Epoxy hardener | 40.3 | 39.9 | 39.9 | 35.9 | 35.9 |
| Degassing additive | | 0.3 | 0.3 | 0.3 | 0.2 | 0.2 |
| Flow additive | | 1.1 | 1.1 | 1.1 | 1.0 | 1.0 |
| TiO$_2$ | Non-metallic, white pigment | 1.5 | 1.5 | 1.5 | 1.3 | 1.3 |
| Sodium Feldspar | Filler | 4.3 | 4.3 | 4.3 | 3.8 | 3.8 |
| BaSO$_4$ | Filler | 6.5 | 6.4 | 6.4 | 5.8 | 5.8 |
| PS1 | Polyorganosiloxane | — | — | — | 10.0 | 10.0 |
| Tris(hydroxymethyl)aminomethane (THAM) | Aminoalcohol | | | 1.0 | | 0.9 |
| Dicalcium phosphate dihydrate | Metal phosphate | — | 1.0 | — | 0.9 | — |
| Aluminium pigment, leafing | Metallic pigment | 1.0 | 1.0 | 1.0 | 1.0 | 1.0 |

TABLE 9

| Time exposed to 5% HCl solution [min] | CE1 ΔL | CE2 ΔL | CE3 ΔL | 11 ΔL | 12 ΔL | 2 ΔL |
|---|---|---|---|---|---|---|
| 15 | 0.09 | −0.01 | 0.1 | 0.01 | 0.02 | 0.0 |
| 30 | −0.3 | −0.01 | 0.1 | 0.03 | 0.02 | −0.1 |
| 60 | −2.0 | −0.3 | −0.5 | −0.02 | −0.3 | −0.9 |
| 90 | −3.5 | −0.8 | −1.8 | −0.4 | −1.1 | −2.2 |
| 120 | −4.6 | −1.4 | −3.1 | −1.0 | −2.1 | −3.4 |

TABLE 10

| Time exposed to 5% HCl solution [min] | CE4 ΔL | CE5 ΔL | 13 ΔL | 2* ΔL |
|---|---|---|---|---|
| 15 | 0.02 | 0.02 | −0.01 | −0.01 |
| 30 | 0.04 | 0.05 | 0.0 | −0.02 |
| 60 | −.09 | 0.01 | 0.01 | −0.05 |
| 90 | −1.46 | −1.0 | 0.0 | −0.4 |
| 120 | −2.7 | −3.8 | −0.6 | −1.4 |

*Same as composition 2 but with 1.0 wt% leafing pigment

The results in Tables 9 and 10 show that the coatings comprising polyorganosiloxane and either an aminoalcohol or a metal phosphate have lower absolute ΔL values than the comparative example which lacks polyorganosiloxane and aminoalcohol and metal phosphate. The results in Tables 9 and 10 also show that the presence of either an aminoalcohol or a metal phosphate in combination with the polyorganosiloxane further improves the acid resistance of the non-leafing pigments present therein compared to polyorganosiloxane alone.

Humidity Resistance

The results are shown in Tables 11 and 12 below.

TABLE 11

| Humidity test, 40° C. | CE2 | CE3 | 11 | 12 | 2 |
|---|---|---|---|---|---|
| ΔE, 24 h | 0.1 | 0.16 | 0.07 | 0.05 | |
| ΔE, 144 h | 3.78 | 0.31 | 0.1 | 0.03 | 0.13 |
| ΔE, 192 h | Stopped | 0.28 | 0.04 | 0.03 | |
| ΔE, 312 h | | 0.14 | 0.2 | 0.13 | 0.73 |
| ΔE, 576 h | | 0.17 | 1.07 | 0.14 | 2.24 |
| Initial gloss | 78 | 95 | 76 | 81 | 88 |
| Maintained gloss, 144 h | 100 | 100 | 100 | 100 | 98 |
| Maintained gloss, 312 h | | 100 | 100 | 99 | 95 |
| Maintained gloss, 576 h | | 100 | 99 | 99 | 80 |

TABLE 12

| Humidity test, 40° C. | CE6 | 13 | 14 | 2* |
|---|---|---|---|---|
| ΔE, 24 h | 6.34 | 0.09 | 0.25 | 1.23 |
| ΔE, 48 h | 7.79 | 0.11 | 3.14 | 5.83 |
| Initial gloss | 88 | 101 | 95 | 98 |
| gloss, 24 h | 38 | 101 | 95 | 95 |
| gloss, 48 h | 21 | 101 | 65 | 39 |

*Same as composition 2 but with 1.0 wt% leafing pigment

The results in Tables 11 and 12 show that the powder coating compositions comprising polyorganosiloxane have improved humidity resistance. The results also show that the presence of either an aminoalcohol or a metal phosphate in combination with the polyorganosiloxane further improves the humidity resistance of both of the non-leafing and leafing pigments present therein compared to polyorganosiloxane alone.

The invention claimed is:

1. A coating layer containing a particulate coating composition, the particulate coating composition comprising:
   (i) at least one polyester polymer present in the particulate coating composition in an amount of from 30% wt % to 80 wt % of the particulate coating composition;
   (ii) at least one hardener present in the particulate coating composition in an amount of from 30% wt % to 80 wt % of the particulate coating composition;
   (iii) at least one metallic pigment present in the particulate coating composition in an amount of at least 0.1 wt % of the particulate coating composition, wherein said metallic pigment comprises metal in elemental form or as an ahoy and is not a metal salt; and
   (iv) at least one polyorganosiloxane
   wherein the coating layer is a single layer coating or a top coat.

2. A coating layer as claimed in claim 1, wherein said metallic pigment is corrodible.

3. A coating layer as claimed in claim 1, wherein said metallic pigment comprises Al or Sn.

4. A coating layer as claimed in claim 1, wherein said polyorganosiloxane has a softening temperature of at least 40° C.

5. A coating layer as claimed in claim 1, wherein said polyorganosiloxane comprises OH and/or OR substituents, wherein R is $C_{1-24}$ alkyl or $C_{6-24}$ aryl.

6. A coating layer as claimed in claim 1, wherein said polyorganosiloxane comprises 1.0-15 wt % of OH groups, based on the total weight of the polyorganosiloxane.

7. A coating layer claimed in claim 1, wherein said polyorganosiloxane comprises a repeat unit of formula (I):

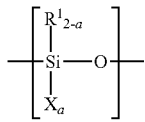

(I)

wherein
each $R^1$ is independently a monovalent organic group;
each X is independently OH, OR' or O—;
each R' is independently $C_{1-24}$ alkyl or $C_{6-24}$ aryl; and
a is 0 or 1.

8. A coating layer claimed in claim 1, wherein said polyorganosiloxane is of the general formula (III):

$$M_m D_n T_o Q_p \quad \text{(III)}$$

wherein
M is a terminal group of the general formula (IIIa)

$$R^3 R^4 R^5 SiO_{1/2} \quad \text{(IIIa),}$$

is a Bifunctional group of the general formula (IIIb)

$$R^6 R^7 SiO_{2/2} \quad \text{(IIIb),}$$

T is a trifunctional group of the general formula (IIIc)

$$R^8 SiO_{3/2} \quad \text{(IIIc),}$$

Q is a unit of the general formula $SiO_{4/2}$,
where each of $R^3$, $R^4$, $R^5$, $R^6$, $R^7$ and $R^8$ is independently selected from a monovalent organic group, a hydroxyl group or an alkoxy group comprising 1 to 10 C, wherein no more than 75% of all of the groups are hydroxyl or alkoxy,
m is an integer 0-20,
n is an integer 0-1000,
is an integer 0-30,
p is an integer 0-20, and
m+n+o+p is an integer which is at least 2.

9. A coating layer as claimed in claim 1, wherein said polyorganosiloxane is a silsesquioxane.

10. A coating layer as claimed in claim 1, further comprising a silane, a metal phosphate, a metal borate and/or an amino alcohol.

11. A coating layer as claimed in claim 10, comprising an amino alcohol.

12. A coating layer as claimed in claim 11, wherein said amino alcohol has one amine group and 2 or more hydroxyl groups.

13. A coating layer as claimed in claim 10, comprising a metal phosphate.

14. A coating layer as claimed in claim 13, wherein said metal phosphate is an ortho-phosphate.

15. A kit comprising:
(i) a first container containing at least one polyester polymer, at least one hardener, and at least one polyorganosiloxane;
(ii) a second container containing at least 0.1 wt % of said at least one metallic pigment, based on the total weight of contents of the containers of the kit, wherein said metallic pigment comprises metal in elemental form or as an alloy and is not a metal salt; and
(iii) instructions for mixing the at least one polyester polymer, at least one hardener, at least one polyorganosiloxane and at least one metallic pigment to form a single coating layer or a top coat containing a particulate coating composition, wherein
the at least one polyester polymer is present in the particulate coating composition in an amount of from 30% wt % to 80 wt % of the particulate coating composition;
the at least one hardener is present in the particulate coating composition in an amount of from 30% to 80 wt % of the particulate coating composition; and
the at least one metallic pigment is present in the particulate coating composition in an amount of at least 0.1 wt % of the particulate coating composition.

16. A process for preparing a coating layer as claimed in claim 1, comprising:
(i) blending the at least one polyester polymer, the at least one hardener, and the least one polyorganosiloxane to form a mixture;
(ii) extruding said mixture to form particles; and
(iii) adding the at least one metallic pigment to the particles.

17. A substrate coated with a single layer coating or a top coat as claimed in claim 1.

18. A coating layer as claimed in claim 1, wherein the particulate coating composition is a powder coating composition.

* * * * *